United States Patent [19]

Scheithauer et al.

[11] Patent Number: 4,594,635

[45] Date of Patent: Jun. 10, 1986

[54] OVERLOAD PROTECTOR FOR COMMUNICATION SYSTEMS

[75] Inventors: Eric A. Scheithauer, Chicago; Donald F. Jaycox, Deerfield, both of Ill.

[73] Assignee: Northern Telecom Limited, Montreal, Canada

[21] Appl. No.: 643,406

[22] Filed: Aug. 23, 1984

[51] Int. Cl.[4] ............................................. H02H 9/06

[52] U.S. Cl. .................................... 361/119; 361/124; 337/32

[58] Field of Search ............... 361/119, 120, 124, 125; 337/31-34, 18, 28

[56] References Cited

U.S. PATENT DOCUMENTS 3,849,750 11/1974 Baumbach et al. ............. 361/119 X
4,502,088 2/1985 Baumbach ...................... 361/119 X

*Primary Examiner*—A. D. Pellinen

*Assistant Examiner*—T. DeBoer

*Attorney, Agent, or Firm*—Schwartz, Jeffery, Schwaab, Mack, Blumenthal & Evans

[57] ABSTRACT

A protector module, or assembly, for telephone lines and similar systems, has line terminals and a ground terminal in the base. The line circuit is between a related pair of line terminals. The line circuit includes part of a line bracket which extends up the side of the housing. The line bracket extends to the outer end of the housing and an aperture in the end of the housing permits access by a test probe to the line bracket. Normally, two line brackets are provided each associated with a pair of line terminals. A ground bracket also extends up the housing, being connected at one end to the ground terminal and having a flange at its other end. Between the outer end of the line bracket and the flange on the ground bracket a back-up or other form of protector member can be positioned.

15 Claims, 13 Drawing Figures

OVERLOAD PROTECTOR FOR COMMUNICATION SYSTEMS

FIELD OF THE INVENTION

This invention relates to an overload protector for systems, particularly an overvoltage and overcurrent protector, for telephone lines.

RELATED ART

Protectors are usually provided, at Central Office locations to protect electrical:and electronic items against power surges, arriving over the telephone lines. Protectors are usually mounted on a connector or other device, which also carries a test facility and a cross-connect facility. In such a connector these facilities are often referred to as "fields", that is, a protector field, a test field and a cross-connect field.

Combining two of these fields can reduce the size of the connector. The present invention combines the test facility with the protector facility.

Protectors for protection against overvoltage conditions are generally of two basic forms, a gas tube protector in which two electrodes are sealed into a support body with a gap between them, at a sub-atmospheric pressure, and a carbon block protector which has two carbon electrodes spaced apart to form a gap at atmospheric pressure. Wnile gas tube and carbon block protectors break down to give either a dead short or a very low breakdown voltage, which condition is readily detected, a gas tube protector can also break down by venting, that is leakage of air into the gap. This raises the breakdown voltage, which is not normally detectable. This is undesirable in that a sufficiently low breakdown voltage is not provided, to protect equipment. It is therefore normal to provide a back-up gap device to take over the protection when the main gap is faulty. The back up gap is arranged to fairly rapidly break down to a short or very low value, which is detectable. The present invention enables either type of protector to be used.

Further, a heat sensitive device can be provided for protection against overcurrent conditions, or where overvoltage conditions persist. The present invention provides for such a heat sensitive device, if desired.

As a normal telephone line has two conductors, Tip and Ring, each of which requires a protector, conveniently two protector assemblies are mounted in one case.

SUMMARY OF THE INVENTION

The present invention provides a protector assembly having line terminals or pins and a ground terminal or pin in the base, with a line bracket forming part of the line circuit between the Central Office terminal and the outside or line terminal. The line bracket extends up to the top or outer end of the housing, where an aperture provides access to the line bracket for testing. A back-up gap device may be positioned between the line bracket and a ground bracket at the top or outer end. The line circuit may include a heat coil assembly.

BRIEF DESCRIPTION OF THE DRAWINGS

The invention will be readily understood by the following description of certain embodiments, by way of example, in conjunction with the accompanying drawings, in which.

DETAILED DESCRIPTION OF THE INVENTION

Figure 1:
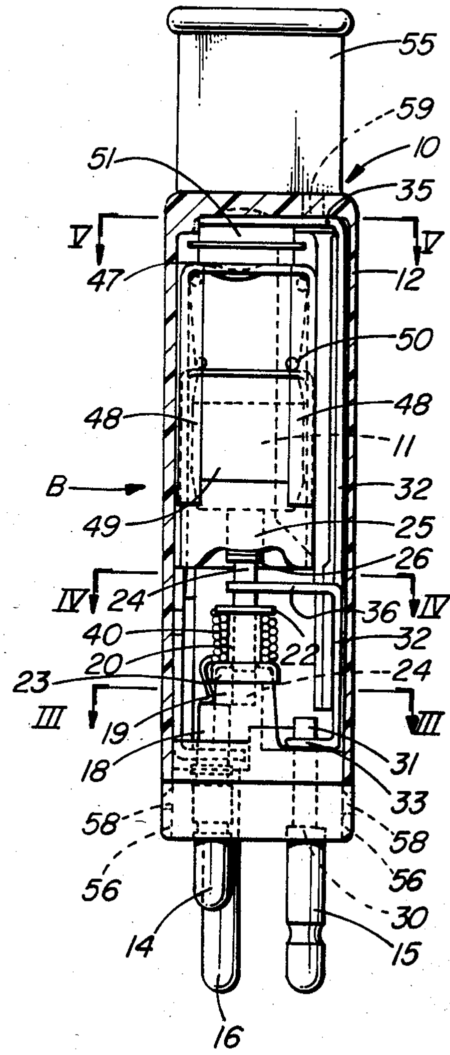
FIG. 1 is a side view of one form of protector assembly with the side wall removed to show interior details, in the direction of arrow A in FIG. 2.

The protector module or assembly 10 illustrated has two protectors, of the gas tube type, a protector between each line and ground. The protectors are indicated at 11 and 11*a*. There are two "lines", Tip and Ring, and as the arrangement and assembly of the various items for each line is generally the same, one line circuit with associated parts will be described. Reference numerals for the other line will be the same as for the line described, with the letter "a" added.

The various parts are assembled and mounted within a molded electrically insulating plastic housing 12 with a molded insulating base 13. In the base are mounted the line pins 14, 14*a* and 15, 15*a* and a ground pin 16. Pin 14 is the central office pin or terminal and the pin 15 is the outside plant or line pin or terminal, pins 14 and 15 forming a pair. The pin 14 is attached to the base 13, as by swaging or ultrasonic welding, the outer end of the pin being adapted to fit a terminal in a connector block, and the inner end 18 projecting above the inner surface of the base for attachment of a lead from a heat coil.

The plastic housing 12 and base 13 are molded with formations which act to position various items of the assembly. The base 13 has two hollow bosses 19, 19*a* extending up from its inner surface. In the example illustrated, a heat coil unit 20, 20*a* rests on each boss. A heat coil unit comprises a spool 21 having a flat flange 22 at its inner end and a hollow annular flange 23 at its outer end. The flange 23 fits over the related boss 19 which positions the heat coil and prevents sideways movement. The boss also opposes the axial force on the heat coil and aids assembly. Within the spool 21 is a shaft 24. The shaft 24 is soldered to the spool 21, but under overcurrent conditions, when the solder is melted, the shaft is free to slide axially in the bore of the spool. The lower or outer end of the shaft is accommodated by a pocket or recess in the boss.

The shaft 24 extends beyond flange 22 and bears against a projecting pin 25 extending from the end of one of the electrodes of the protector 11. A flange 26 is formed on the shaft 24 at its inner end to limit movement towards the base.

The outside plant pin 15 extends through the base 13, being inserted from the outside of the base and positioned axially by a shoulder 30 which is positioned against the surface of a recess in the outer surface of the base. The outer end of pin 15 is adapted to fit a terminal in a connector block and the inner end 31 extends a short distance above the inner surface of the base. A line bracket 32 is attached to the inner end 31 of pin 15.

Figure 3:
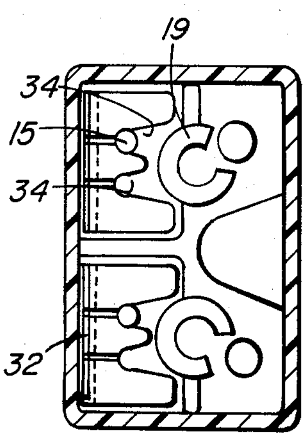
FIGS. 3, 4 and 5 are cross-sections on the lines III—, IV—IV and V—V respectively of FIG. 1.

The line bracket 32 extends the length of the housing 12, positioned against a back wall of the housing. At its lower or inner end a leg 33 extends normal to the length of the bracket. The leg has two slots extending in from its free end. These slots are seen at 34 in FIG. 3. The inner end of the pin 15 is a snap fit in one of the slots 34. Two slots are provided so that only one form of bracket is required, the pin 15 being asymmetric relative to the bracket, and the particular slot used depends upon which side of the protector assembly the bracket is in. The fit of the pin 15 is enhanced by providing an annular groove on the inner end of the pin. As an alternative, the pin 15 can be permanently attached, as by swaging, with holes instead of slots 34 being provided.

Figure 4:
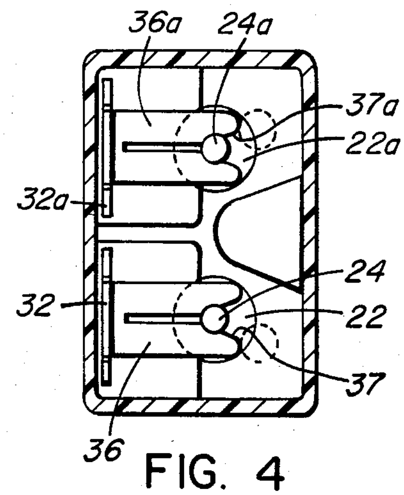
Figure 5:
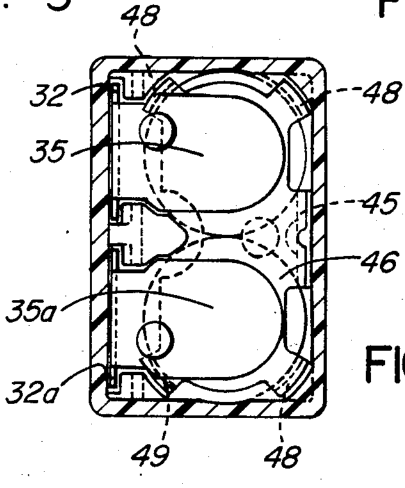
Figure 6:
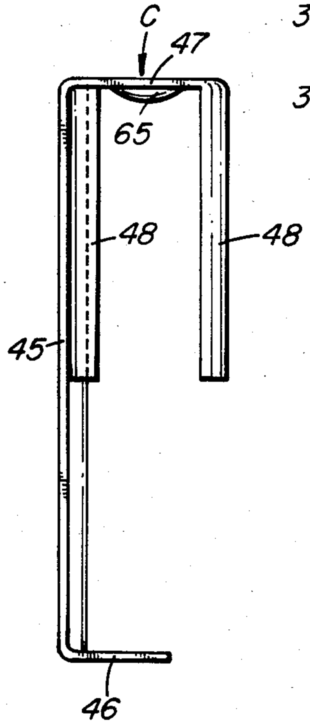
FIG. 6 is a side view of the ground member of the assembly.
Figure 7:
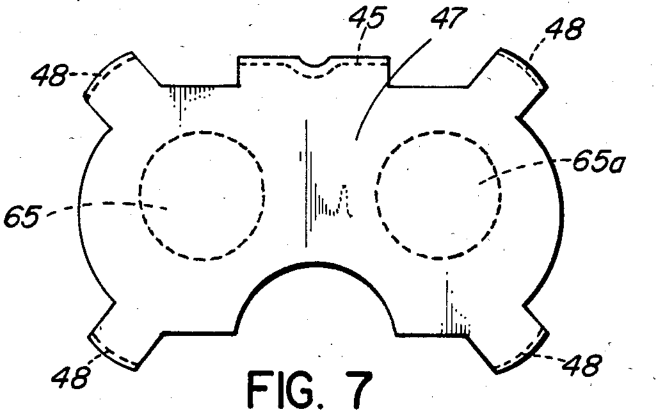
FIG. 7 is a top view of the ground member of FIG. 6, in the direction of arrow C.
Figure 8:
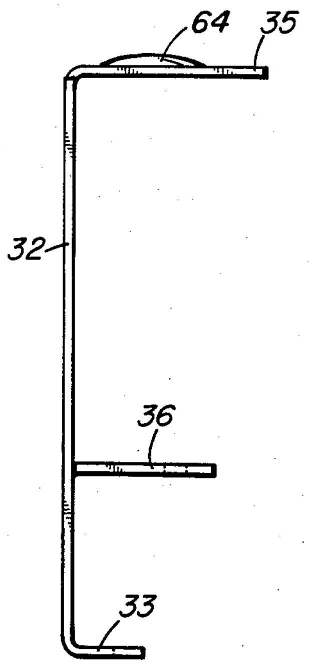
FIG. 8 is a side view of one of the line brackets of the assembly.
Figure 9:
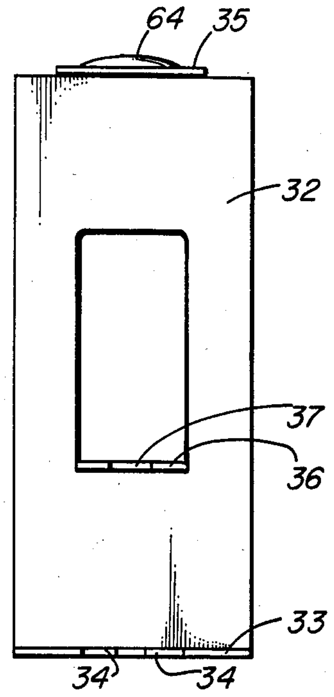
FIG. 9 is a front view of the line bracket in FIG. 8.

At the upper or outer end the bracket 32 has a further leg 35 extending normal to the length of the leg. Leg 35 fits in a recess formed in the end of the housing 12. At an intermediate position a third leg 36 extends normal to the length of the bracket. Leg 36 has a slot 37, seen in FIG. 4, which is a close sliding fit on the shaft 24 at a position spaced from the flange 26 and between flange 26 and the spool flange 22. Leg 36, by means of the slot 37, engages the shaft 24 in a manner that provides an electrical contact between the leg 36 and shaft 24, but which permits axial movement of the shaft 24.

The spool 21 and the shaft 24 are secured together by a low melting point solder, such as a 49.5% Bi, 27.5% Pb, 13.1% Sn, 10.1% Cd solder, to form a rigid assembly. A length of insulated wire is wrapped round the spool, as indicated at 40, with one end of the wire attached to a flange of the spool, normally the flange 23. The other end of the wire is attached to the end 18 of the central office terminal 14.

The ground assembly comprises a ground bracket 45 which extends along in the housing 12 on the opposite wall to the line brackets 32 and 32*a*. At the lower or inner end a leg 46 extends normal to the length of the bracket, the leg being attached to the inner end of the ground pin 16. At the upper or outer end the ground bracket has a flange or leg 47 which extends over both protector units 11 and 11*a*. Four narrow arcuate extensions 48 extend towards the lower or inner end of the ground bracket. The extensions 48 engage the outside of cups 49, 49*a* which are positioned over the protector units 11 and 11*a*.

Compression springs 50, 50*a* are positioned between the lower surface of the flange 47 and the upper ends of the cups 49, 49*a*. Between the flange 47 and the legs 35 and 35*a* are positioned separating members 51 and 51a. Separating members 51 and 51*a*, in the example illustrated are back-up protector members, which become effective at a voltage at least slightly higher than the voltage at which the main protectors 11 and 11*a* become effective. The back-up protectors can be of a back-up gap form, of a solid state form or other as desired.

A handle 55 extends from the end of the casing, for pulling out the protector module or assembly, and for insertion of the module. At the lower or inner end, the casing extends at 56 for back and front walls, and in each wall there are two apertures 57. On the back and front surfaces of the base 13 there are formed two projections 58. When the base is pushed on to the housing, the ends 56 deform outwards and the projections 58 move into engagement in the apertures 57, the ends 56 snapping back. This holds the base securely to the housing.

Figure 10:
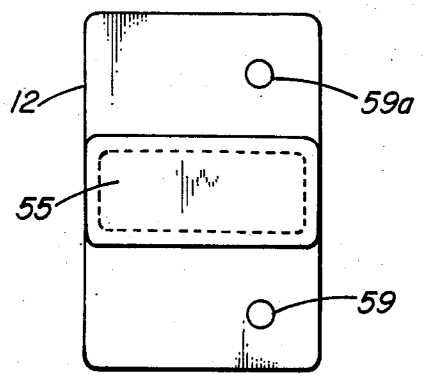
FIG. 10 is a top plan view of the protector assembly in FIG. 1.
Figure 11:
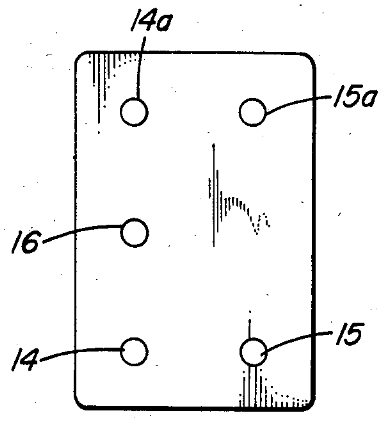
FIG. 11 is a bottom plan view of the protector assembly in FIG. 1.
Figure 12:
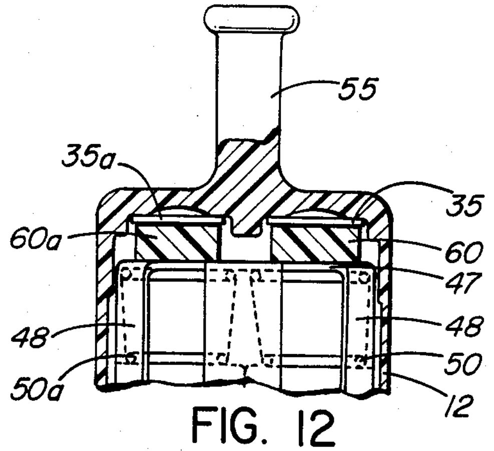
FIGS. 12 and 13 are partial views, similar to the top and bottom parts respectively of FIG. 2, illustrating modifications.

As seen in FIG. 10, two test ports 59, 59*a* are formed in the outer end of the housing 12. The test ports are aligned with the legs 35, 35*a* of the line brackets 32, 32*a* and permit insertion of a test plug or test probes to contact the line brackets for testing. FIG. 11 is a view of the base of the protector assembly and the two sets of line pins 14, 14*a* and 15, 15*a* are seen and also ground pin 16.

The protector assembly is assembled as follows. The heat coil assembly of spool 20 and wire winding 40 and shaft 24 are positioned over a boss 19 and the wire end attached, as by welding or soldering, to the pin 14. Pin 15 is inserted through the base and the line bracket 32 attached by engaging the leg 33 on to the end 31 of the pin 15. At the same time the leg 36 engages with the shaft 24. The ground pin 16 with the ground bracket 45 attached is inserted into the base, with protectors 11 and 11*a* and springs 50 and 50*a* in position, plus cups 49, 49*a*. The cups 49, 49*a* are tilted slightly to rest on lateral extensions 45*a* extending from the ground bracket 45, to retain the cups and springs in positions while inserting the ground bracket. The pins 25 and 25*a* from the protectors 11 and 11*a* rest on the flanges 26, 26*a* of the shafts 24, 24*a*. The ground brackets and pin 16 are pushed to collapse the springs 50, 50*a* and the back-up gap items 51 and 51*a* inserted between the flange 47 and legs 35 and 35*a*. The ground bracket is then released to grip the items 51 and 51*a*. This assembly procedure would require modifying if the pins 15 were attached by swaging.

The arrangement operates in a conventional manner. Overvoltage surges occurring on either, or both, telephone lines will normally cause a spark discharge across the gap in one or both protectors 11 and 11*a*, to ground, via cups 49, 49*a* extensions 48 and 9round bracket 45 to the ground pin. On the occurrence of a current overload, the wire windings 40, 40*a* cause melting of the solder holding the shafts 24, 24*a* to the spools 21, 21*a*. This permits the shafts to be pushed down, together with the protectors 11, 11*a* and cups 49, 49*a* under the pressure of the springs 50, 50*a*. The edges of the cups engage the legs 36, 36*a* of the line brackets, grounding the lines. One or both of the heat coils may experience melting of the solder depending upon whether the overload current is on one or both lines.

Continued operation of the protectors under overvoltage conditions will also cause melting of the solder by conduction of heat from the protectors down the shafts 24, 24*a*.

The protector assembly has been described with the use of gas tube protectors at 11 and 11a, and with back-up gap members 51, 51*a*. If carbon block protectors are used at 11, 11*a*, or any other form of protector not requiring a back-up member, then members 51, 51*a* can be omitted. Carbon block protectors are normally of the same overall dimensions as gas tube protectors and are a straight forward replacement. To avoid changing other parts of the structure when back-up members are not used, separating members in the form of spacer members are used, indicated at 60, 60*a*, to replace the members 51, 51*a*. The spacers 60, 60*a* are of insulating material.

Also, of course, the actual form of back-up member 51, 51*a* provided can vary widely, and also its relationship with the primary gap can be varied, depending upon the particular relative characteristics of the member 51, 51*a* and the primary gap in the protector 11, 11*a*.

Figure 13:
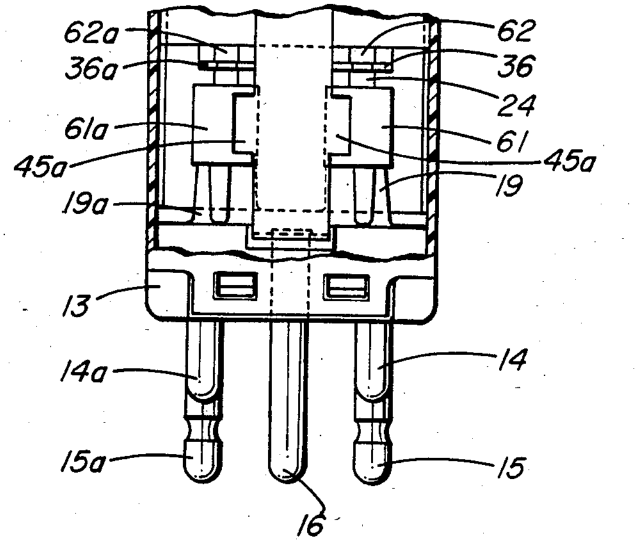

A further modification is the omission of the heat coil unit 20, 20*a*. If this particular feature is not required, the heat coil unit can be replaced by a spacer. This is illustrated in Figure 13, where spacers 61, 61*a* are shown. In this example the spacers replace the spool 21, 21*a* and the shaft 24, 24*a*, with the leg 36, 36*a*, of the line bracket 32, 32*a*, engaging with an extension 62, 62*a* on the spacer 61, 61*a*.

When a spacer is used, instead of a heat coil, then provision must be made to shunt the related pair of terminals, i.e. terminals 14 and 15 and terminals 14*a* and 15*a*. This can be done by making the spacer of electrically conductive material and connecting the spacer to the terminals, or by providing an electrical shunt in the base to directly connect the terminals of a pair.

Figure 2:
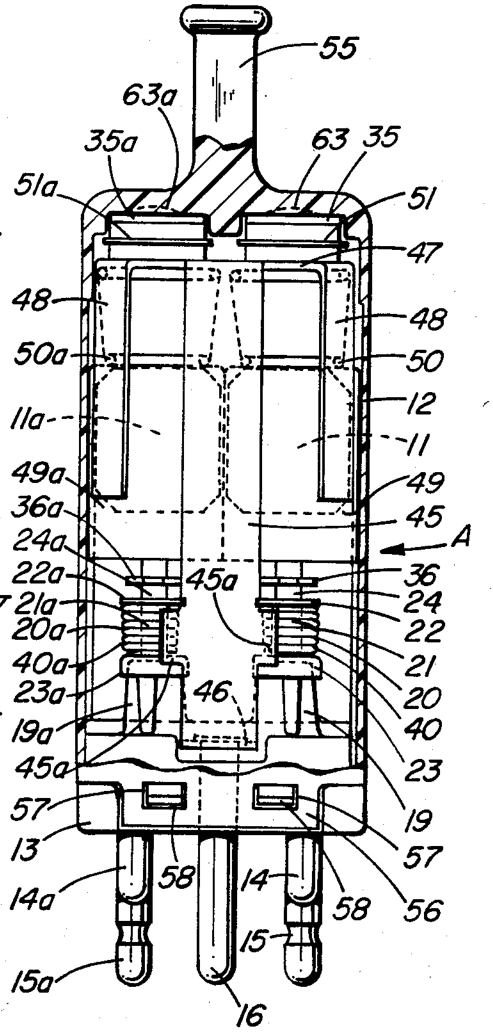
FIG. 2 is a front view of the assembly of FIG. 1 with the front wall removed for most of the assembly length to show interior details, in the direction of arrow B in FIG. 1.

With all modifications, it is possible to test from the top or outer end of the protector assembly via the test ports 59, 59*a*. In the example illustrated in FIGS. 1 and 2, using back-up members 51, 51*a*, the internal surface of the housing at the top or outer end is formed with shallow concave recesses 63, 63*a*. Similarly, the legs 35, 35*a* of the line brackets have a domed portion 64, 64*a* which rest in the recesses 63, 63*a*. Domed portions 65, 65*a* are also formed in the flange or leg 47 of the ground bracket 45. These domed portions extend away from each other when the line brackets and ground bracket are assembled in the unit and the back-up members 51, 51*a* have convex outer surfaces which sit in the opposed domed portions, giving a good electrical contact and also providing positioning of the members.

The protector unit or assembly of the present invention can be used to replace other protector units, providing a front test facility. As previously stated, a protector unit can contain only one protector, but normally two protectors are provided.

What is claimed is:

1. An overload protector assembly for telecommunications systems, including an elongate housing of insulating material, said housing having a closed outer end and an open inner end, and a base attached to said inner end, a pair of line terminals in said base and a ground terminal in said base;

- a line bracket extending in said housing along one side thereof and attached at an inner end to one of said line terminals;
- a ground bracket extending in said housing along another side thereof and attached at an inner end to said ground terminal;
- an overvoltage protector unit positioned at an intermediate position in said housing and including opposed electrodes spaced apart along the house to define an arc gap;
- circuit means connecting an inner one of said electrodes to the other of said line terminals;
- a first extension on said line bracket connected to said circuit means to provide a line circuit between said line terminals;
- a second extension on said line bracket extending across said housing at said outer end;
- a flange at an outer end of said ground bracket extending across said housing at a position between said second extension on said line bracket and an outer one of said electrodes;
- a compression spring between said flange and said outer one of said electrodes;
- a normally non-conductive structural separating member in contact with said flange and said second extension wherein a portion of said normally non-conductive structural separating member is positioned directly below said second extension and sid portion is directly above said flange; and
- an aperture in said outer end of said housing to permit electrical connection to said second extension of said line bracket.

2. A protector assembly as claimed in claim 1, said opposed electrodes comprising carbon blocks, said gap being at ambient pressure.

3. A protector assembly as claimed in claim 1, said overvoltage protector comprising a gas-tube protector.

4. A protector assembly as claimed in claim 3, said normally non-conductive structural separating member positioned between said flange and said second extension comprising a further protector member adapted to breakdown at a predetermined power condition.

5. A protector assembly as claimed in claim 4, said further protector member comprising a subsidiary gap, said subsidiary gap defined by two spaced electrodes.

6. A protector assembly as claimed in claim 5, said electrodes sealed to define a subsidiary gap at a predetermined pressure, the further protector adapted to fail short.

7. A protector assembly as claimed in claim 1, including an electrically conductive cup fitting over said overvoltage protector, said cup having a base in electrical connection to said outer one of said electrodes, said spring in contact with said base of said cup, said cup including an open end having a peripheral edge facing towards said base and spaced from said first extension on said line bracket; said circuit means including telescoping members connected by a fusible material, said telescoping members opposing the action of said compression spring; fusing of said fusible material permitting collapse of said telescoping members and contact of said peripheral edge with said first extension.

8. A protector assembly as claimed in claim 7, said flange at said outer end of said ground bracket including extensions extending towards the inner end of the ground bracket and in engagement with the outside of said cup.

9. A protector assembly as claimed in claim 1, said circuit means including a heat coil assembly; said heat coil assembly including a spool; a wire coil around said spool, one end of said wire connected to said other of said line terminals and the other end of said wire connected to said spool; a shaft mounted for axial movement in said spool, said shaft fixed in an extended position by a fusible material between said shaft and said spool; said shaft connected at an end remote from said spool to said inner one of said electrodes; said fusible material opposing movement of said shaft and said overvoltage protector under the action of said spring; and a shunt extending from said outer one of said electrodes of said overvoltage protector and having a free end spaced from said first extension on said line bracket; whereby on fusion of said fusible material, said overvoltage protector and said shunt move towards said base, said shunt contacting said first extension.

10. A protector assembly as claimed in claim 9, said first extension on said line bracket comprising a leg extending substantially normal to said bracket, said leg including a slot extending in from its free end towards the bracket, the slot a close fit on said shaft, said shaft capable of axial movement in said slot.

11. A protector assembly as claimed in claim 1, including two pairs of line terminals in said base, two line brackets positioned in said housing, a bracket associated with each pair of line terminals; two overvoltage protector units positioned side by side; circuit means associated with each overvoltage protector unit; said flange on said ground bracket extending over both overvoltage protectors; two compression springs extending side by side; a spring associated with each overvoltage protector; two non-conductive separating members, a separating member associated with each overvoltage protector; and two apertures in said outer end of said housing, an aperture aligned with each line bracket.

12. A protector assembly as claimed in claim 11, each of said separating members comprising a further protector member adapted to break down at a predetermined power condition, said further protective member having an effective operating voltage at least slightly higher than that of the said overvoltage protector unit.

13. A protector assembly as claimed in claim 12, said further protective member adapted to breakdown to an electrical shunt at said effective operating voltage.

14. A protector assembly as claimed in claim 12, said further protective member adapted to prevent a voltage rise above said effective operating voltage.

15. The protector assembly as claimed in claim 1 wherein said flange overlaps said second extension and said normally non-conductive structural separating member extends transversely across a substantial portion of the housing; and wherein said normally non-conductive structural separating member is positioned between the overlapping portion of said flange and said second extension.

* * * * *